United States Patent
Ebert et al.

(10) Patent No.: US 8,740,546 B2
(45) Date of Patent: Jun. 3, 2014

(54) GUIDE VANE FOR A CONDENSATION STEAM TURBINE AND ASSOCIATED CONDENSATION STEAM TURBINE

(75) Inventors: Christoph Ebert, Dresden (DE); Albert Langkamp, Dresden (DE); Markus Mantei, OT Friedersdorf (DE)

(73) Assignee: Siemens Aktiengesellschaft, München (DE)

( * ) Notice: Subject to any disclaimer, the term of this patent is extended or adjusted under 35 U.S.C. 154(b) by 715 days.

(21) Appl. No.: 12/989,997

(22) PCT Filed: Apr. 29, 2009

(86) PCT No.: PCT/EP2009/055211
§ 371 (c)(1),
(2), (4) Date: Oct. 28, 2010

(87) PCT Pub. No.: WO2009/133146
PCT Pub. Date: Nov. 5, 2009

(65) Prior Publication Data
US 2011/0129343 A1    Jun. 2, 2011

(30) Foreign Application Priority Data
Apr. 30, 2008  (EP) .................................... 08008261

(51) Int. Cl.
| | |
|---|---|
| *F01D 5/18* | (2006.01) |
| *F01D 5/14* | (2006.01) |
| *F01D 5/28* | (2006.01) |
| *F01D 9/00* | (2006.01) |
| *F01D 25/00* | (2006.01) |
| *F01D 25/32* | (2006.01) |

(52) U.S. Cl.
CPC ................ *F01D 5/147* (2013.01); *F01D 5/282* (2013.01); *F01D 9/00* (2013.01); *F01D 25/005* (2013.01); *F01D 25/007* (2013.01); *F01D 25/32* (2013.01); *F05D 2220/31* (2013.01); *F05D 2300/603* (2013.01)
USPC ......... 415/17; 415/47; 415/169.2; 415/169.3; 415/208.1; 415/200; 416/39; 416/229 R; 416/230; 416/241 A

(58) Field of Classification Search
CPC .......... F01D 5/147; F01D 5/282; F01D 9/00; F01D 25/005; F01D 25/007; F01D 25/32; F04D 2220/31; F05D 2300/603
USPC ............ 415/17, 47, 169.2, 169.3, 208.1, 200; 416/37, 39, 229 R, 230, 241 R, 241 A
See application file for complete search history.

(56) References Cited

U.S. PATENT DOCUMENTS

| | | |
|---|---|---|
| 2,377,611 A | 6/1945 | Caldwell |
| 2,540,472 A | 2/1951 | Clarke |
| 3,997,758 A | 12/1976 | Patel |

(Continued)

FOREIGN PATENT DOCUMENTS

| | | |
|---|---|---|
| EP | 1156189 A1 | 11/2001 |
| EP | 1788197 A1 | 5/2007 |

(Continued)

*Primary Examiner* — Igor Kershteyn

(57) ABSTRACT

A guide vane of a condensation turbine steam turbine is provided, wherein the guide vane includes a heating resistor. The guide vane includes fiber composite material at least in some regions. The heating resistor may be embodied as a heating wire or as a heating film. A condensation steam turbine having a guide vane as described above is also provided.

15 Claims, 3 Drawing Sheets

(56) References Cited

U.S. PATENT DOCUMENTS

| | | | |
|---|---|---|---|
| 4,504,191 A * | 3/1985 | Brown | 416/5 |
| 5,112,194 A | 5/1992 | More | |
| 5,281,091 A * | 1/1994 | Dooley et al. | 415/178 |
| 5,785,498 A | 7/1998 | Busbey et al. | |
| 8,006,934 B2 * | 8/2011 | Alexander et al. | 244/134 D |
| 2007/0187381 A1 * | 8/2007 | Vontell et al. | 219/202 |

FOREIGN PATENT DOCUMENTS

| | | |
|---|---|---|
| EP | 1921271 A2 | 5/2008 |
| GB | 1401176 A | 7/1975 |
| GB | 2288441 A | 10/1995 |

\* cited by examiner

GUIDE VANE FOR A CONDENSATION STEAM TURBINE AND ASSOCIATED CONDENSATION STEAM TURBINE

CROSS REFERENCE TO RELATED APPLICATIONS

This application is the US National Stage of International Application No. PCT/EP2009/055211, filed Apr. 29, 2009 and claims the benefit thereof. The International Application claims the benefits of European Patent Office application No. 08008261.3 EP filed Apr. 30, 2008. All of the applications are incorporated by reference herein in their entirety.

FIELD OF INVENTION

The invention relates to a guide vane for a condensation turbine and a condensation steam turbine having an inventive guide vane.

BACKGROUND OF INVENTION

With a steam turbine, the thermal energy of the steam is converted into mechanical work. The mechanical work is used to drive the condensation steam turbine. To this end, a shaft extending through the condensation steam turbine, the so-called rotor, is driven with the aid of turbine blades. The rotor is usually coupled to a generator for energy generation.

Rotor blades and guide vanes are provided to drive the rotor. The rotor blades are fastened to the rotor and rotate therewith. The guide vanes are fixedly arranged on the turbine housing. The guide vanes are molded and arranged here such that they provide for a favorable and efficient flow guide of the steam through the turbine and thus enable as effective a conversion of the thermal energy into mechanical work as possible. When converting thermal energy into mechanical work, both the temperature and also the pressure of the steam reduces. To achieve as high a degree of efficiency as possible, the condensation steam turbine is generally divided into different regions, a high pressure part and a low pressure part. In large power plants, the steam is currently reduced to approximately 50 mbar. In the case of turbines for industrial power plants which are configured for lower outputs, the steam in the low pressure part is reduced to a final pressure of 100 mbar. For efficiency reasons, in other words for as high a degree of efficiency as possible, attempts should basically be made to achieve as low a final pressure as possible. However, the necessary technical measures become ever more complicated and expensive as the final pressure reduces. The afore-cited current limits for the final pressure are essentially specified here by economical considerations. Newer developments aim to further reduce the afore-cited final pressures both in the case of large power plants and also in industrial power plants.

A problem associated with the low final pressures is the so-called water-droplet erosion, which results in considerable wear of the rotor blades. As a result of low pressures in the low pressure part of the condensation steam turbine, water is increasingly condensated out onto the stationary guide vanes. In this process, droplets form on the guide vane. The droplets are carried along here by the steam flow, from the rear edge of the guide vane, and then arrive at the rotating rotor blades with high energy, in particular at their leading edge. This effect produces a significant load on the rotor blades and in some unfavorable instances results in rapid and premature destruction of individual rotor blades.

The risk of water-droplet erosion is currently counteracted above all with mechanical means, in which the leading edges of the rotor blades are embodied in a particularly stable fashion. To this end, these are especially hardened or so-called stellite plates are applied thereto. Furthermore, with some guide vanes, the guide vane blades are heated with the aid of steam so that moisture deposition on the guide vanes can largely be eliminated as a cause of droplet erosion. For heating with steam, the guide vane is embodied with an internal cavity, through which cavity the steam is routed. The formation of guide vanes with a corresponding cavity and the supply of the steam to the cavity guide vanes however requires a significant constructive effort and is therefore expensive. Furthermore, steam heating encounters limiting factors in the case of small steam turbines, in particular in industrial steam turbines. As a result of the small guide vanes used there, these cannot be provided with a cavity for stability reasons.

The steam heating of rotor blades in the low pressure final stages is thus ruled out in the case of very small condensation steam turbines.

To also be able to heat guide vanes of smaller condensation steam turbines, EP 1 156 189 A1 proposes an electrical heating system. Here the vane is heated by way of an electrical heating resistor. The guide vane herewith comprises a central recess for receiving the heating resistor. The heating element is arranged here inside the guide vane. To guarantee good thermal transmission, the guide vane is embodied solidly from solid matter.

The disadvantage of these guide vanes is that a recess for the heating resistor has to be introduced into the solid matter. This recess negatively affects and/or reduces the stability and the mechanical properties of the guide vane. For stability reasons, the penetration depth of the borehole for receiving the heating resistor is restricted. As a result of the guide vanes embodied solidly from solid matter, high material costs also result and the weight of the guide vanes is relatively high.

SUMMARY OF INVENTION

Based on the prior art, the object underlying the invention is to provide a guide vane for a condensation turbine, which can be heated by way of a heating resistor and features an improved mechanical characteristic, a higher stability and a lower weight when compared with the prior art. A further object of the invention is to provide a condensation steam turbine with a correspondingly heated guide vane.

The object is achieved in respect of the guide vane by the features of the claims. In respect of the condensation steam turbine, the object of the invention is achieved by the features of the claims.

Advantageous embodiments and developments, which can be used individually or in combination with one another, form the subject matter of the subclaims.

The inventive guide vane for a condensation steam turbine, which comprises a heating resistor, is characterized in that the guide vane contains fiber composite material at least in regions. By using fiber composite material, the guide vane is not embodied solidly from solid matter as in the prior art. On the one hand, the weight of the guide vanes can herewith be clearly reduced, on the other hand the construction can be significantly simplified. The fiber composite material enables the heating resistor to be attached/fixed to the guide vane more easily. The introduction of a borehole to receive the heating resistor can be omitted. As a result, the guide vane is not mechanically attenuated. The guide vane is thus significantly more stable in mechanical terms than in the prior art.

An inventive preferred embodiment of the invention provides for the heating resistor to be laminated into the fiber composite material. By laminating the heating resistor, this is positioned and fixed exactly. The lamination of the heating resistor can take place in a simple fashion. The heating resistor is herewith preferably laminated between two layers made of fiber composite material. The lamination provides for a permanent connection of the heating resistor with the guide vane.

A particularly advantageous embodiment of the invention provides for the heating resistor to be embodied as a heating wire or as a heating film. The heating resistor herewith becomes very flexible and can as a result adjust particularly well to the contour of the guide vane. The use of thin heating wires or heating films allows the heating resistor to be laminated particularly easily into the fiber composite material.

A further advantageous embodiment of the invention provides for the heating resistor to be arranged in a region of the guide vane which is close to the surface. The arrangement close to the surface of the guide vane produces a particularly good thermal transmission from the heating resistor to the surface of the guide vane, thereby ensuring a rapid and even heating of the surface. The even and effective heating of the surface ensures that liquid which is deposited on the guide vane can evaporate quickly and prevents the feared droplet formation and the water-droplet erosion produced thereby.

A further preferred embodiment of the invention ensures that the heating power of the heating resistor can be controlled or regulated. The heating power can herewith be adjusted such that sufficient heating power is present in each case in order to prevent a liquid film on the surface of the guide vane but furthermore such that unnecessarily large quantities of heating power are not introduced. The degree of efficiency can herewith be optimized. The use of a thin heating wire or a heating film, which is arranged in the region of the guide vane close to the surface, enables a very quick control or regulation to take place, since the change in the heating power becomes effective on the surface very quickly.

The invention also includes a condensation steam turbine comprising a guide vane as claimed in one of claims 2 to 5.

In accordance with the invention, the condensation steam turbine preferably comprises a controller or a regulator of the heating power of the heating resistor, which takes place as a function of the operating point of the condensation steam turbine. In this way, only the required amount of heating power is output to the heating resistor and the degree of efficiency of the guide vane heating system is optimized. The heating power must be controlled or regulated here such that only so much heating power is output to the heating resistor so that no liquid film can foam on the guide vane. In some instances, a slight liquid film on the guide vane is tolerable, namely if the liquid droplets separated from the steam flow at the edge have such a minimal diameter that no damage is effected on the rotor blades as a result of droplet erosion.

The idea underlying the inventive guide vane is to significantly simplify the construction of the guide vane by using fiber composite material and in particular to significantly simplify the attachment of an electrical heating resistor to the guide vane. It is herewith possible to dispense with a solid embodiment of the guide vane, as was previously necessary, without the stability and durability of the guide vane being reduced.

BRIEF DESCRIPTION OF THE DRAWINGS

Exemplary embodiments and further advantages of the invention are described below with reference to the drawings, in which.

Figure 1:
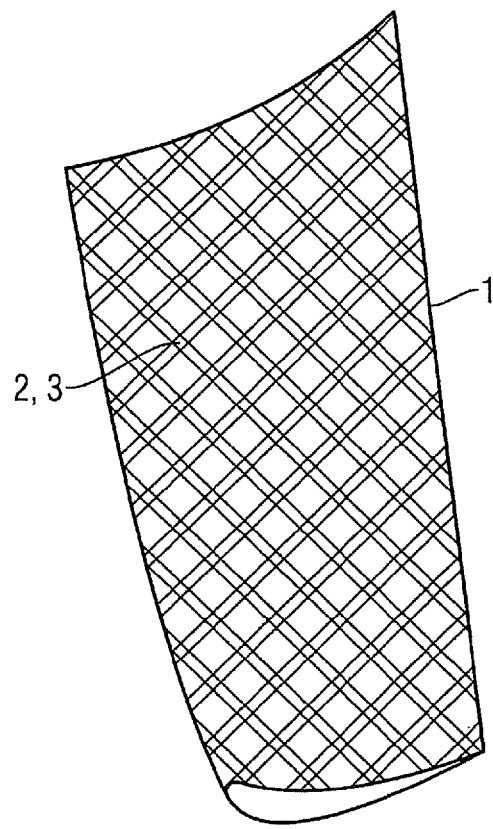
FIG. 1 shows a first exemplary embodiment of an inventive guide vane in a schematically perspective view.

Each of the figures shows a very simplified representation, in which only the essential components needed to describe the invention are shown.

The same and/or functionally similar components are provided with the same reference character across all the figures.

DETAILED DESCRIPTION OF INVENTION

FIG. 1 shows a first exemplary embodiment of a guide vane 1 in a schematic perspective view. The guide vane 1 is manufactured from a fiber composite material, which contains glass fibers and/or carbon fibers. In the exemplary embodiment, the guide vane 1 is manufactured completely from fiber composite material. There is however also the possibility to manufacture the guide vane 1 from fiber composite material only in some regions. To optimize weight and rigidity in the case of larger plate thicknesses, there is in particular the option of arranging a solid body 5 (see FIG. 6) inside the guide vane 1 and laminating this with fiber composite material.

The guide vane 1 comprises a heating resistor 2 in the form of a heating wire 3. The heating wire 3 is arranged crosswise along the surface of the guide vane 1 and therewith forms a wire mesh. At least one further layer of fiber composite material is attached over the wire mesh, so that the wire mesh is laminated into the fiber composite material. As a result, the wire mesh is fixedly connected to the guide vane 1 and forms a solid unit herewith.

Figure 2:
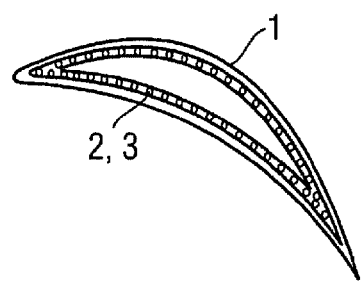
FIG. 2 shows a longitudinal section through the guide vane shown in FIG. 1

As apparent from FIG. 2, the heating wire 3 is arranged adjacent to the surface of the guide vane 1. The heating wire 3 is laminated between the fiber composite material such that it follows the contour of the guide vane 2. A rapid change in temperature can be realized by arranging the heating resistor 2 adjacent to the surface of the guide vane 1. To heat the guide vane 1, the heating resistor 2 is heated to the necessary heating temperature by applying an electrical current. The heating temperature of the heating resistor 2 can be adjusted by a control or regulating device (not shown) in accordance with the respective operating point of the condensation steam turbine.

Figure 3:
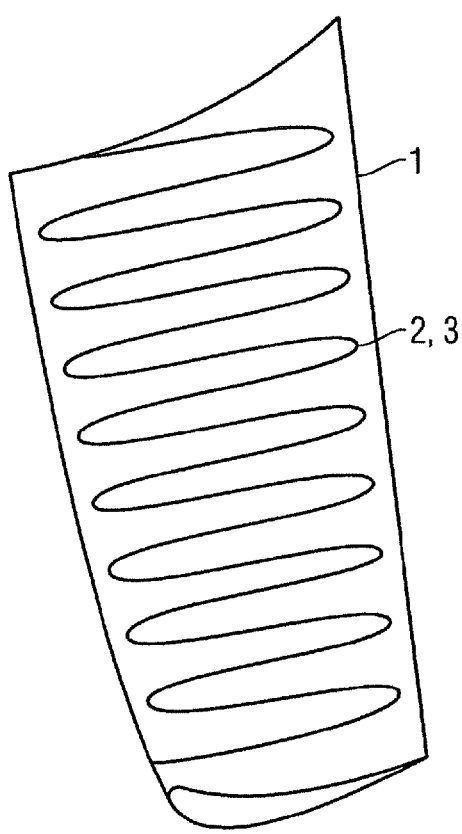
FIG. 3 shows a second exemplary embodiment of an inventive guide vane in a schematically perspective view.

FIG. 3 shows a perspective view of a second exemplary embodiment of a guide vane 1. The guide vane 1 is in turn embodied from fiber composite material, into which a heating resistor 2 is laminated. The heating resistor 2 is embodied as a heating wire 3 and arranged in a meandering fashion along the contour of the guide vane 1. As apparent from FIG. 4, the heating wire 3 is not arranged here along the entire contour of the guide vane 1 but instead only in a sub region of the guide vane 1. The heating wire 3 is only located here on the lower side of the guide vane 1 and on the rear discharge region of the guide vane 1. In this region, when the guide vane 1 is used in a condensation low pressure turbine, liquid droplets form as a result of the condensed steam, said liquid droplets then being detached from the rear edge of the guide vane 1 and striking the rotor blade with high energy and damaging the same. Heating this critical region of the guide vane 1 prevents liquid from condensing and thus droplets from depositing on the rear edge of the guide vane 1. The water is evaporated by heating the guide vane surface. A water-droplet erosion is thus effectively prevented by heating the surface of the guide vane 1. The heating resistor 2 is in turn arranged adjacent to the surface, in other words in a region of the guide vane 1 near to the surface. A good thermal transmission is herewith ensured and a rapid change in the heating temperature, in particular as a function of the operating point of the condensation steam turbine, is ensured.

Figure 4:
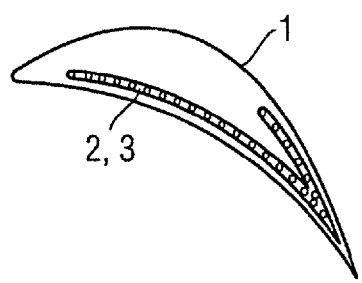
FIG. 4 shows a cross-section through the guide vane shown in FIG. 3.
Figure 5:
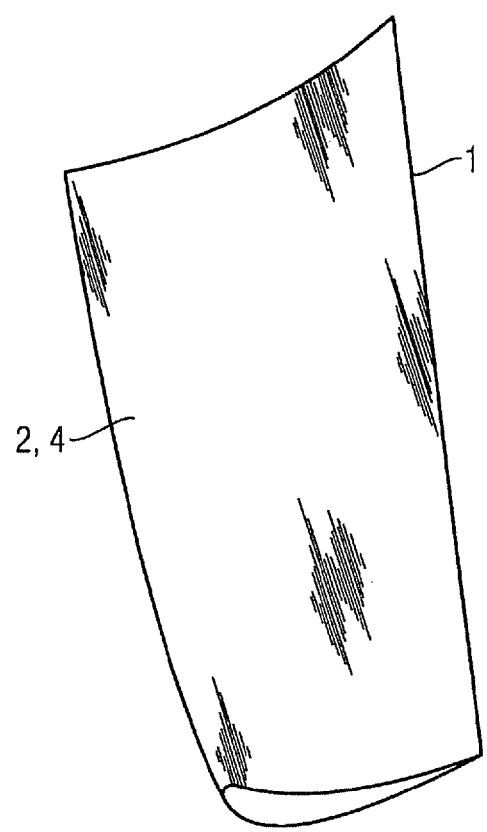
FIG. 5 shows a third exemplary embodiment of an inventive guide vane in a schematic perspective view.

FIG. 4 shows a third exemplary embodiment of a guide vane 1 in a perspective view. The heating resistor 2 is herewith embodied in the form of a heating film 4, which extends along the contour of the guide vane 1. The guide vane 1 in turn consists of a fiber composite material and the heating foil 4 is laminated into the guide vane 1. The heating film 4 is in turn arranged in a region of the guide vane 1 near to the surface.

Figure 6:
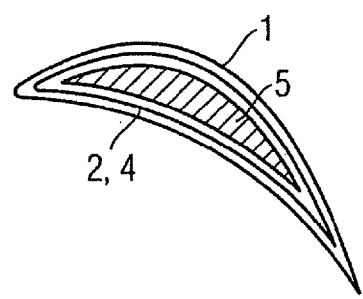
FIG. 6 shows a cross-section through the guide vane shown in FIG. 5.

As apparent from FIG. 6, the guide vane 1 is not completely embodied from a fiber composite material, but instead exhibits a core 5 made of a filler material. A solidity and weight-optimized guide vane 1 is herewith produced. Guide vanes containing filler material are advantageous particularly with larger guide vane thicknesses.

The heating resistor 2 used in all exemplary embodiments is embodied to be high resistive in each instance. A high heating power can be achieved as a result.

As the fiber composite material tends to absorb moisture, the region containing the fiber composite material is enclosed with a deformable moisture-impermeable protective layer, which prevents the penetration of moisture into the fiber composite material. Advantageously, the moisture-repelling protective layer completely encloses the turbine blade section.

The guide vanes shown are particularly suited to installation into a condensation steam turbine. The control or regulation of the heating power of the heating resistor takes place during operation of the condensation steam turbine as a function of the operating point. The heating power is as a result optimally adjusted to the given operating parameters and produces an optimized degree of efficiency of the electrical heating system.

The invention claimed is:

1. A guide vane for a condensation steam turbine, comprising:
    a heating resistor,
    wherein the guide vane includes a fiber composite material at least in some regions,
    wherein the heating resistor is embodied as a heating wire, and
    wherein the heating wire is only located on a lower side of the guide vane and on a rear discharge region of the guide vane.

2. The guide vane as claimed in claim 1, wherein the heating resistor is laminated into the fiber composite material.

3. The guide vane as claimed in claim 2, wherein the heating resistor is laminated between two layers comprising the fiber composite material.

4. The guide vane as claimed in claim 1, wherein the heating resistor is arranged in a region of the guide vane close to a surface of the guide vane.

5. The guide vane as claimed in claim 1, wherein a heating power of the heating resistor is controlled or regulated.

6. The guide vane as claimed in claim 1, wherein the guide vane includes a solid body inside the guide vane laminated with the fiber composite material.

7. The guide vane as claimed in claim 1, wherein the fiber composite material is enclosed with a moisture repelling protective layer.

8. A condensation steam turbine, comprising:
    a guide vane, comprising:
        a heating resistor,
        wherein the guide vane includes a fiber composite material at least in some regions,
        wherein the heating resistor is embodied as a heating wire, and
        wherein the heating wire is only located on a lower side of the guide vane and on a rear discharge region of the guide vane.

9. The condensation steam turbine as claimed in claim 8, wherein a control or regulation of a heating power of the heating resistor takes place as a function of an operating point of the condensation steam turbine.

10. The condensation steam turbine as claimed in claim 8, wherein the heating resistor is laminated into the fiber composite material.

11. The condensation steam turbine as claimed in claim 10, wherein the heating resistor is laminated between two layers comprising the fiber composite material.

12. The condensation steam turbine as claimed in claim 8, wherein the heating resistor is arranged in a region of the guide vane close to a surface of the guide vane.

13. The condensation steam turbine as claimed in claim 8, wherein a heating power of the heating resistor is controlled or regulated.

14. The condensation steam turbine as claimed in claim 8, wherein the guide vane includes a solid body inside the guide vane laminated with the fiber composite material.

15. The condensation steam turbine as claimed in claim 8, wherein the fiber composite material is enclosed with a moisture repelling protective layer.

* * * * *